United States Patent [19]

Nagaosa et al.

[11] Patent Number: 5,497,744
[45] Date of Patent: Mar. 12, 1996

[54] FUEL INJECTOR WITH AN INTEGRATED SPARK PLUG FOR A DIRECT INJECTION TYPE ENGINE

[75] Inventors: Hideo Nagaosa; Kazuhisa Mogi; Takahiro Kushibe, all of Susono; Norihiko Nakamura; Kenichi Nomura, both of Mishima, all of Japan

[73] Assignee: Toyota Jidosha Kabushiki Kaisha, Toyota, Japan

[21] Appl. No.: 345,186

[22] Filed: Nov. 28, 1994

[30] Foreign Application Priority Data

Nov. 29, 1993 [JP] Japan ............................ 5-298080
Nov. 29, 1993 [JP] Japan ............................ 5-298164

[51] Int. Cl.$^6$ .................................................... F02M 57/06
[52] U.S. Cl. .................................................... 123/297
[58] Field of Search ............................ 123/297, 169 V; 313/120

[56] References Cited

U.S. PATENT DOCUMENTS

| | | | |
|---|---|---|---|
| 2,255,203 | 9/1941 | Wiegand | 123/297 |
| 2,391,220 | 12/1945 | Beeh | 313/120 |
| 2,441,277 | 5/1948 | Lamphere | 123/169 V |
| 3,830,204 | 8/1974 | McAlister | 123/297 |
| 4,319,552 | 3/1982 | Sauer et al. | 123/297 |
| 4,448,160 | 5/1984 | Vosper | 123/297 |
| 4,700,678 | 10/1987 | Elliott | 123/297 |
| 4,955,340 | 9/1990 | Elliott | 123/297 |
| 4,967,708 | 11/1990 | Linder et al. | 123/297 |

FOREIGN PATENT DOCUMENTS

| | | |
|---|---|---|
| 1002694 | 8/1965 | European Pat. Off. |
| 0333097 | 9/1989 | European Pat. Off. |
| 4140962 | 1/1993 | European Pat. Off. |
| 63-154760 | 10/1988 | Japan |
| 4-542752 | 2/1992 | Japan |

Primary Examiner—Willis R. Wolfe
Attorney, Agent, or Firm—Kenyon & Kenyon

[57] ABSTRACT

A fuel injector with an integrated spark plug for a direct injection type engine capable of adequate fuel injection and adequate spark discharge, even if it becomes very hot because the end part of device is exposed in a combustion chamber and a spark discharge is induced there. An electric conductor is disposed along the central axis, and the electric conductor is electrically coupled with a cable for supplying electric current for the spark discharge. A needle valve made of conductive material is electrically coupled with the electric conductor through a return spring made of conductive material and is reciprocally moved by a solenoid. A needle housing made of conductive material receives the needle valve and has a nozzle for injecting fuel and a center electrode at its end. A grounding electrode is disposed near the center electrode. Insulators are disposed outside of the electric conductor. Out side of the insulators, an outer cylinder is disposed, which is composed of inner wall which adheres to the insulators and outer wall which is placed outside of the inner wall at a uniform clearance which is used as a fuel passage. A connector assembly for connecting a fuel line and an electric cable for supplying electric current to the solenoid is attached to the outer cylinder.

10 Claims, 6 Drawing Sheets

FUEL INJECTOR WITH AN INTEGRATED SPARK PLUG FOR A DIRECT INJECTION TYPE ENGINE

BACKGROUND OF THE INVENTION

1. Field of the Invention

The present invention relates to a fuel injector with an integrated spark plug for a direct injection type engine.

2. Description of the Related Art

A fuel injector with an integrated spark plug is developed to be used in a direct injection type engine.

It is required that a fuel injector with an integrated spark plug supplies desired amount of fuel, at a desired timing as a fuel injector and induces a spark discharge with desired intensity, at a desired timing and desired position, as a spark plug.

A fuel injector with an integrated spark plug becomes very hot because the end part of the device is exposed in a combustion chamber and a spark discharge is induced there.

If spark discharge occurs close to a outer surface of a needle housing, the needle housing is made very hot. Therefore, fuel which contacts inner surface of the hot needle housing is heated and tar will deposit in the fuel and the fluidity of the fuel will be deteriorated, so that it will be difficult to inject the fuel adequately.

If an electrode is disposed in the path of a fuel spray injected from a nozzle of injector, fuel will stick to the electrode, then will be exposed in the combustion gas, carbon will deposit on the electrode, and it will be difficult to induce a suitable spark discharge because the gap is not adequate.

Therefore, attention should be paid to the position of the spark discharge in a fuel injector with an integrated spark plug.

Also, it is important to maintain the alignment of the elements which compose a fuel injector with an integrated spark plug in order that the fuel may be injected adequately.

In addition to these points, attention should be paid to the insulation between the electric conductors and other metallic elements so that the solenoid operates correctly to activate needle valve, and so that an adequate spark discharge is induced.

Figure 5:
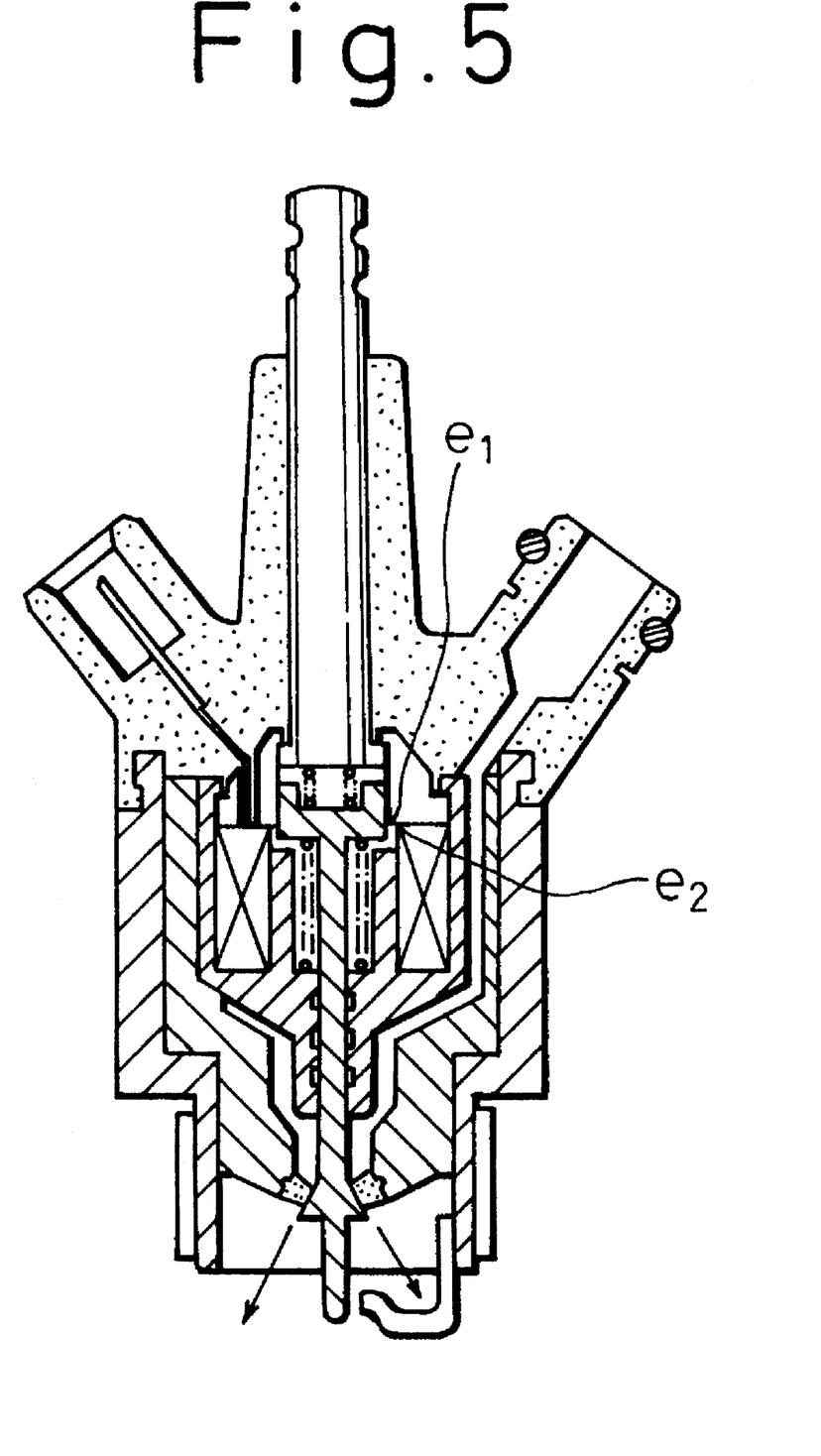
FIG. 5 is a sectional view of an fuel injector with an integrated spark plug of a prior art.

In the fuel injector with an integrated spark plug disclosed in the Japanese Unexamined Utility Model Publication [KOKAI] No. 63-154760 (shown in FIG. 5), the fuel passage which is disposed between a yoke and a housing is not symmetrically arranged around the center axis, so that fuel contained inside of the fuel injector is unequally cooled. Therefore, it is feared that strain occurs and the elements do not align accurately and, as a result, fuel is not injected adequately.

Also, the above type fuel injector with an integrated spark plug has insufficient insulation between a central electric conductor and a solenoid. Therefore, it is possible that a high voltage electric current leaks from "$e_1$" to "$e_2$" (shown in FIG. 5) and is applied to the solenoid and, as a result, an adequate spark discharge and an adequate injection of fuel is not attainable.

In the fuel injector with an integrated spark plug disclosed in the Japanese Unexamined Patent Publication [KOKAI] No. 4-54275, a spark discharge occurs outside of the wall of injector inside of which fuel is contained, therefore the fuel is heated and tar will deposit.

SUMMARY OF THE INVENTION

Therefore, an object of the present invention is to provide a fuel injector with an integrated spark plug capable of adequate fuel injection and adequate spark discharge.

According to the present invention there is provided a fuel injector with an integrated spark plug for a direct injection type engine. The fuel injector with an integrated spark plug for a direct injection type engine comprises, an electric conductor disposed along the central axis and coupled with a cable for supplying electric current for a spark discharge, a needle valve made of conductive material and electrically coupled to the electric conductor through a return spring made of conductive material and reciprocally moved by a solenoid, a needle housing made of conductive material which receives the needle valve and has a nozzle for injecting fuel and a center electrode at its end, a grounding electrode disposed to oppose the center electrode, an insulator disposed outside of the electric conductor, outer cylinder which is disposed outside of the insulator and includes an inner wall which adheres to the insulators and an outer wall which is placed outside of the inner wall with a uniform clearance which is used as a fuel passage, and a connector assembly for connecting a fuel line and an electric cable for supplying an electric current to the solenoid.

The present invention will be more fully understood from the description of the preferred embodiments of the invention set forth below, together with the accompanying drawings.

DESCRIPTION OF THE PREFERRED EMBODIMENTS

Figure 1:
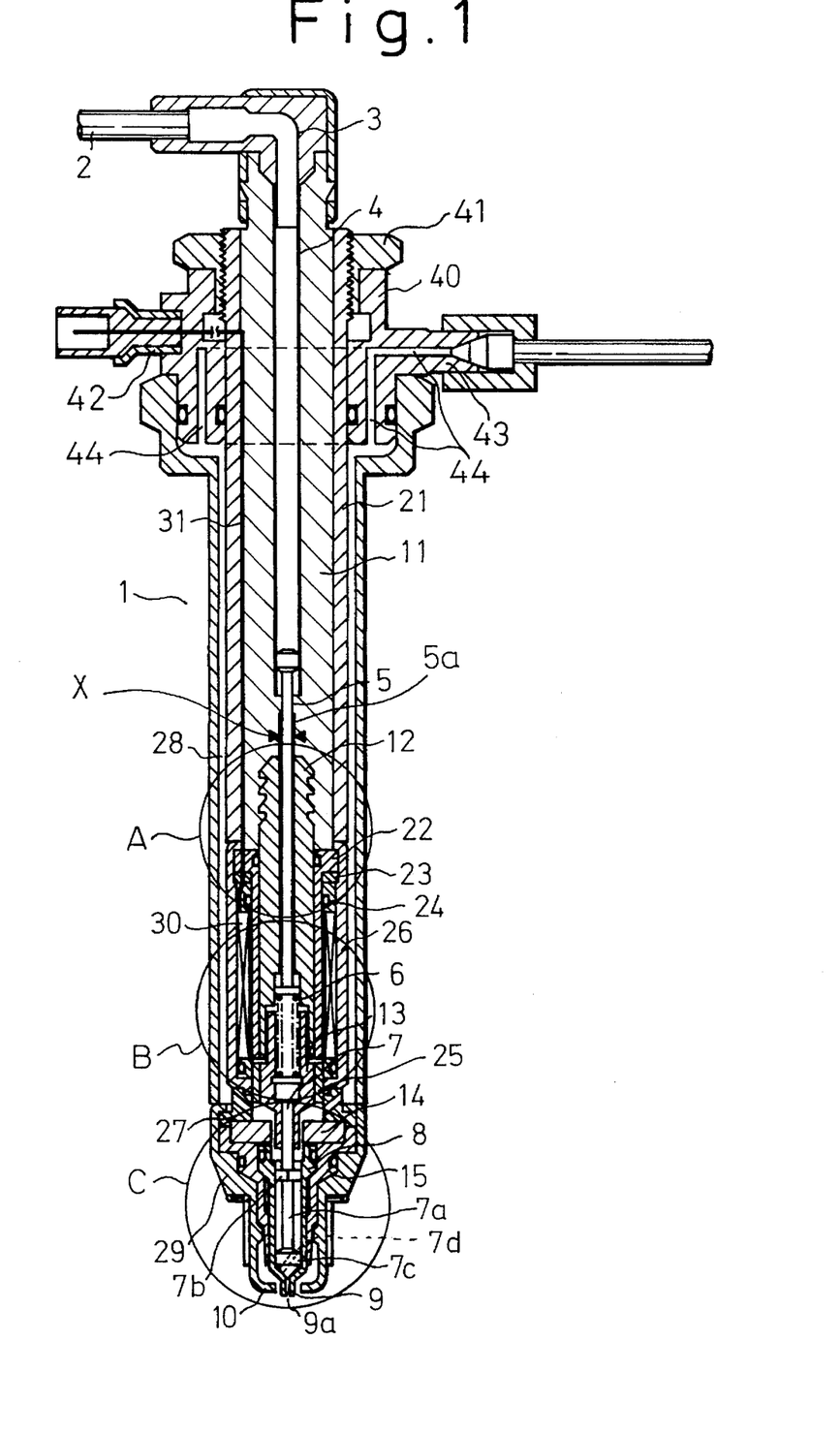
FIG. 1 is a sectional view of an fuel injector with an integrated spark plug of the present invention.

In FIG. 1, reference numeral 1 represents fuel injector with an integrated spark plug for a direct injection type engine.

A high tension cord 2 is connected to a distributor (not shown) at the first end, and is connected to the first end of a first electric conductor 3 at the second end. The other end of the first electric conductor 3 is inserted and connected to one end of a second electric conductor 4 which has a cylindrical shape. Into the other end of the second electric conductor 4, one end of an adjusting bar 5 is inserted and connected.

The adjusting bar 5 is located inside of an adjusting pipe 5a which is set in close contact to the inner surface of a second insulator 12. The adjusting bar 5 and the adjusting pipe 5a are fixed to each other by caulking at position "X".

The other end of the adjusting bar 5 pushes and contacts one end of a return spring 6, which is made of conductive material.

The other end of the return spring 6 pushes and contacts a top surface of a needle 7, which is made of conductive material. The needle 7 is slidably received in a needle housing 8, which is made of conductive material.

A center electrode is located at the top of the needle housing 8.

A nozzle 9a is located at the center of the center electrode.

As described above, the first electric conductor 3, the second electric conductor 4, adjusting bar 5, return spring 6, needle 7 and needle housing 8 are located along the center axis and high voltage electric current flows in them.

These are insulated by a first insulator 11, a second insulator 12, a third insulator 13, a fourth insulator 14 for positioning and a fifth insulator 15 from a first cylinder 21, a second cylinder 22 with flange, a shim 23, a spur 24, a collar 25, a third cylinder 26, fuel line located body 27, a first housing 28 and a second housing 29.

The top of the second housing 29 surrounds the center electrode 9 and forms a grounding electrode.

A solenoid 30 activates needle 7 when the electric current is supplied through the cord 31 and the fuel is then injected by nozzle 9a.

Connector body 40 is inserted between the first cylinder 21 and the enlarged end of the first housing 28 and locked by a nut 41, therefore the direction of the connector body 40 is freely adjustable, even if the whole unit is attached to the cylinder head of the engine by a threaded connection.

The connector body 40 has an electric connector 42 to connect an outer electric supply wire with the wire 31 and a fuel line connector 43 to connect the outer fuel line to the injector and an inner fuel line 44 to introduce fuel from outer fuel line to a fuel passage between the first cylinder 21 and the first housing 28.

Figure 2:
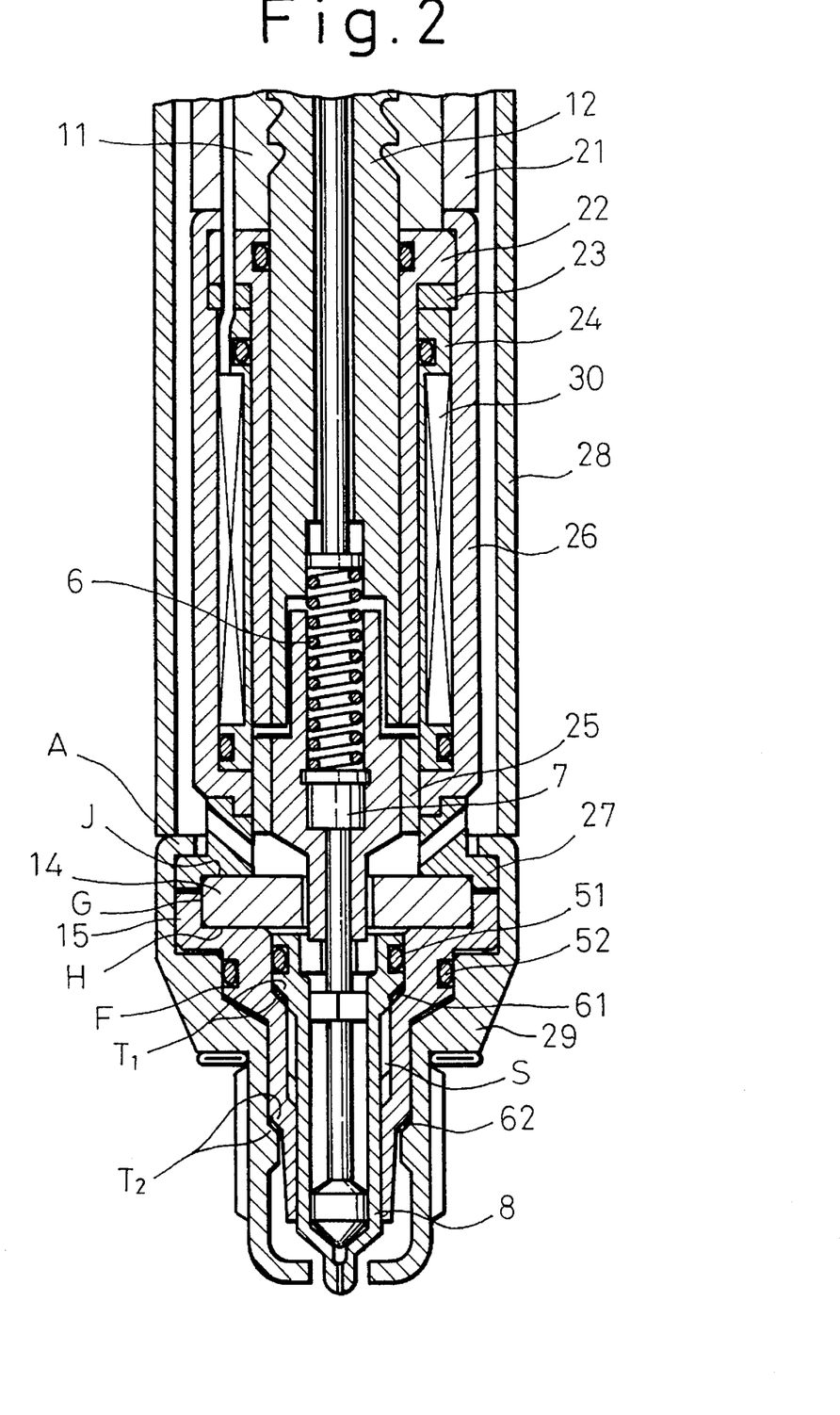
FIG. 2 is a enlarged detail of the lower part of FIG. 1.

Hereinafter, measures taken for attaining the better performance are described referring FIG. 2 which shows the detail of the lower part of the fuel injector with an integrated spark plug according to the present invention.

To attain a sufficient accuracy, the above described parts are assembled according to the following order:

(1) The needle housing 8 to which O-ring 51 is previously assembled, is installed to the fifth insulator 15 by threading, at portion "S" by rotating the inner hexagonal recess using a hexagonal wrench. In this procedure, gas seal 61 is installed tapered portion "$T_1$";

(2) Then, the fifth insulator 15, to which needle housing 8 is installed as above, is installed into second housing 29. The fifth insulator 15 contacts with the second housing 29 at part F with good accuracy, so that the O-ring 52 fulfils its sealing function and the center of the fifth insulator 15 and the center of the second housing 29 are coincide with each other at the large diameter portion of. A gas seal 62 is installed tapered portion "$T_2$";

(3) Then, the fourth insulator 14 for positioning is set on the recess of the fifth insulator 15, and the fuel line located body 27 is set on the fourth insulator 14 for positioning, then the top end of the second housing 29 is bent inwards. Thus, the needle housing 8 having the center electrode 9 at the top, the fifth insulator 15, the fourth insulator 14 for positioning, the fuel line located body 27 and the second housing 29 is assembled.

The fourth insulator 14 for positioning contacts the fifth insulator 15 at the portion "G" and "H", and also contacts with the fuel line located body 27 at the portion "I" and "J" to maintain accuracy;

(4) Then, the seat portion of the inner side of the needle housing 8 is machined and polished by referring to the inner surface of fuel line located body 27 as a fiducial plane, because errors at the threaded portion of needle housing 8 and the fifth insulator 15 and at other parts accumulate and deteriorate the alignment of the central electrode 9 and the fuel line located body 27; and (5) The assembly which includes the needle 7, the third insulator 13 and the collar 25 are incorporated. The collar 25 and the fuel line located body 27 should be aligned when assembled, because the collar 25 and the fuel line located body 27 contacts to each other.

To adjust the bias force of the return spring, the adjusting pipe 5a, in which the adjusting bar 5 is previously installed, is stuck to the second insulator 12, then the adjusting pipe 5a is calked at the portion "X" (shown in FIG. 1) after conclusion of the positioning so that a suitable bias force is attained, because the first inoculator 11 and the second insulator 12 are made of non-metallic material which are not suitable for calking.

To increase the strength against the combustion pressure, adhesives ,are applied into the clearance of the screw portion of needle housing 8 and the fifth insulator 15. These parts are then completely fixed, so that more strength is attained.

By receiving the combustion pressure at "J" portion and "H" portion, each having large area, and to calk at portion "A" where the outer diameter is large, less force per unit area is received and, as a result, an advantage is attained in the point of strength.

The collar 25, the second cylinder 22 with flange and the third cylinder 26 which surrounds the solenoid 30 are made of a ferrous magnetic material to form a closed magnetic circuit around the solenoid 30, to prevent the magnetism generated by the solenoid 30 from leaking away. By this way, magnetic field is increased, and a compact construction is attained.

In addition, the fuel line located body 27 and the first cylinder 21 are made of non-magnetic material, for instance stainless steel or the like, to prevent the magnetism from leaking through the third cylinder, collar 25, fuel line located body 27, the second housing 29, cylinder head (not shown) or through the third cylinder 26 and the first cylinder 21.

It is important to separate the electric line of ignition system and the electric line of injector system to maintain the reliability and the performance, because the second housing 29 also works as the ground for the spark plug.

Other measures are taken for preventing the high voltage electric current from leaking, and are described below referring FIG. 3A to FIG. 3C.

Figure 3A:
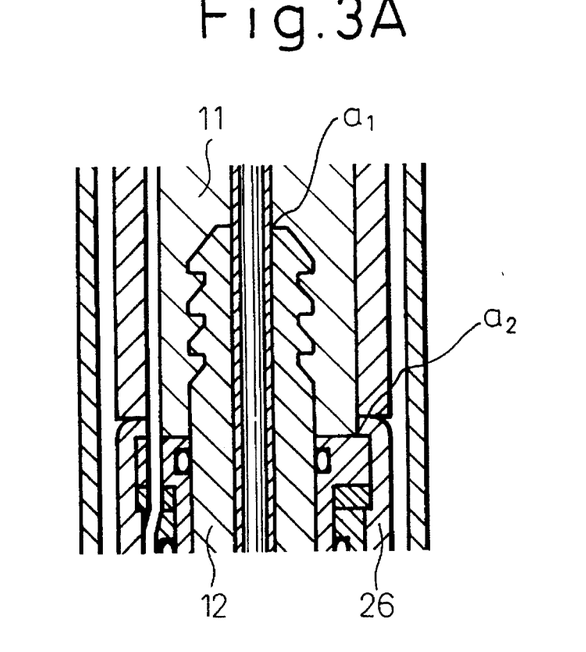
FIG. 3A is a enlarged detail of the portion A in FIG. 1.

FIG. 3A is a enlarged drawing of portion "A" in FIG. 1 showing the joint between the first insulator 11 and the second insulator 12. As shown in FIG. 3A, the plane of the joint of the first insulator 11 and the second insulator 12 contacts; with the adjusting pipe 5a as a electric conductor in which high voltage electric current flows, at point "$a_1$", and contacts with the third cylinder 26 which is made of metallic material at point "$a_2$". Therefore, point "$a_1$" and "$a_2$" are connected through the above described plane of the joint. However, the plane of the joint has a cross section of a saw tooth form, and point "$a_1$" and "$a_2$" are kept sufficiently distant from each other. Therefore, no spark discharge occurs between the points "$a_1$" and "$a_2$".

Figure 3B:
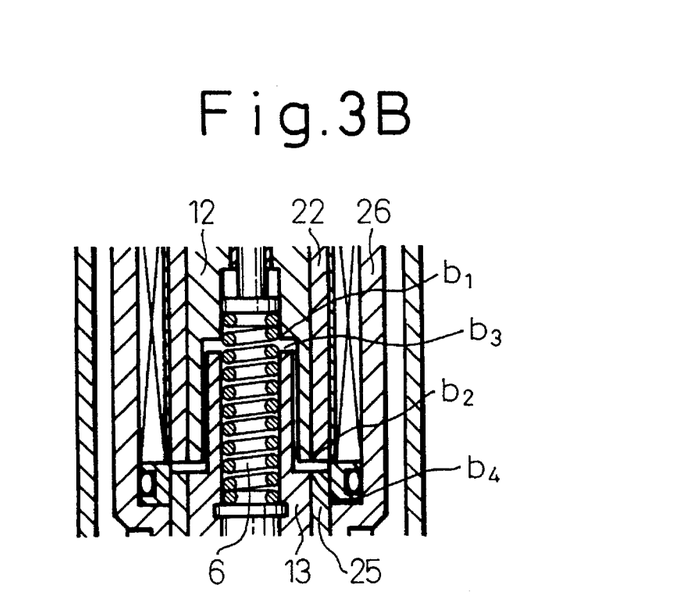
FIG. 3B is a enlarged detail of the portion B in FIG. 1.

FIG. 3B is a enlarged drawing of portion "B" in FIG. 1 showing the joint of the first insulator 11 and the second insulator 12. As shown in FIG. 3B, the lower end plane of the second insulator 12 contacts with the return spring 6 as a electric conductor in which high voltage electric current flows, at point "$b_1$" and contacts with the second cylinder 22 with flange which is made of metallic material at point "$b_2$". In the same manner, the upper end plane of the third insulator 13 contacts with the return spring 6 at point "$b_3$" and contacts with the collar 25 which is made of metallic material at point "$b_4$". Therefore, points "$b_1$" and "$b_2$" and points "$b_3$" and "$b_4$" are respectively connected through each end plane. However, the each plane has a crank shaped cross section, and points "$b_1$" and "$b_2$" and points "$b_3$" and "$b_4$" are respectively kept sufficiently distant from each other. Therefore, no spark discharge occur between points "$b_1$" and "$b_2$" and points "$b_3$" and "$b_4$".

Figure 3C:
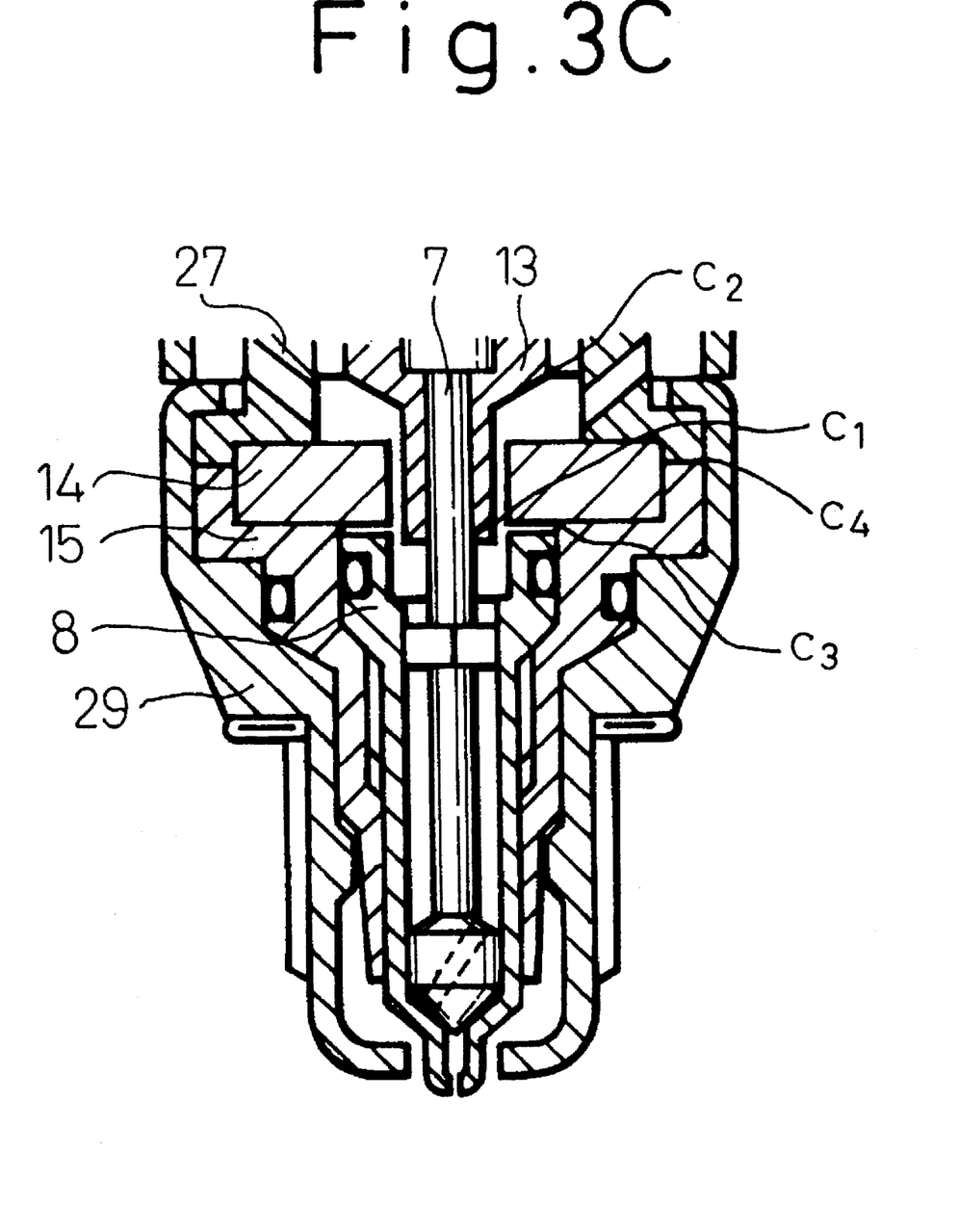
FIG. 3C is a enlarged detail of the portion C in FIG. 1.

FIG. 3C is a enlarged drawing of portion "C" in FIG. 1 showing the joint of the first insulator 11 and the second insulator 12. As shown in FIG. 3C, the lower end plane of the third insulator 13 contacts with the needle 7 as a electric conductor in which high voltage electric current flows, at point "$c_1$", and contacts with the collar 25 which is made of metallic material at point "$c_2$". In the same manner, the inner top of the fifth insulator 15 contacts with the needle housing 8 as a electric conductor at point "$c_3$" and contacts with the fuel line located body 27 which is made of metallic material at point "$c_4$". Therefore, points "$c_1$" and "$c_2$" and points "$c_3$" and "$c_4$" are respectively connected through continuous plane. However, the each plane has a cross section having right angled portion, and points "$c_1$" and "$c_2$", and points "$c_3$" and "$c_4$" are respectively kept sufficiently distant from each other. Therefore, no spark discharge occur between points "$c_1$" and "$c_2$", and points "$c_3$" and "$c_4$"

Now the operation of the device is described. Firstly, the operation as a fuel injector is described.

The fuel supplied through the outer fuel pipe enter into the unit from the connecting portion 43 of the connecting body 40. Then the fuel passes through, the inner passage 44 of the connecting body 40, the fuel passage between the first cylinder 21 and the first housing 28, the fuel path between the third cylinder 26 and the first housing 28, and reaches at the fuel line located body 27. Then, the fuel passes through the fuel line which connect the outer and inner portion of the fuel line located body 27 and reaches the inner side of the fuel line located body 27. Then, the fuel passes through the clearance between the third insulator 13 and the fourth insulator 14 for positioning, and reaches the portion which is defined by the shaft 7a of the needle 7, the upper surface of the intermediate guide 7b, the bottom surface of the third insulator 13 and the needle housing 8. The intermediate guide 7b has a quadrilateral shape while the the inner surface of the needle housing 8 has a round shape. Therefore, the fuel passes through the clearance between the intermediate guide 7b and the needle housing 8, and reaches the portion which is defined by the shaft 7a of the needle 7, the lower surface of the intermediate guide 7b, the upper surface of the top part 7c of the needle 7 and the needle housing 8.

The lower surface of the top part 7c of the needle 7 is cone shaped and is connected to the upper surface by an oblique passage through the top part 7c. Therefore, the fuel can reach the under side of the top part 7c of the needle 7, regardless of the position of the needle.

The conical bottom part of the needle housing 8 has more gentle slope than the slope of the cone shaped lower surface of the top part 7c and has a nozzle 9a.

When an electric current is not supplied to the solenoid 30, the needle 7 is pushed down by the bias force of the return spring 6, and the tip of the top part 7c of the needle 7 enters into the nozzle hole 9a, so that the fuel cannot pass through the nozzle hole 9a.

When an electric current is supplied to the solenoid 30, the needle 7 is pulled up, and the tip of the top part 7c of the needle 7 moves out of the nozzle hole 9a, so that the fuel can pass through the nozzle 9a, and can be injected into the combustion chamber.

Secondly, the operation of the device as a spark plug is described. The high voltage electric current from the distributor reaches the unit through a high-tension cable. The high voltage electric current then passes through the first electric conductor 3, the second electric conductor 4, the adjusting bar 5, the return spring 6, the needle 7, the needle housing 8 and reaches the center electrode 9 which is located at the center of the end of the needle housing 8. A grounding electrode 10 is formed around the center electrode 9. Therefore, a spark discharge occurs at the gap "s" (shown in FIG. 4) between the center electrode 9 and the ground electrode 10.

Figure 4:
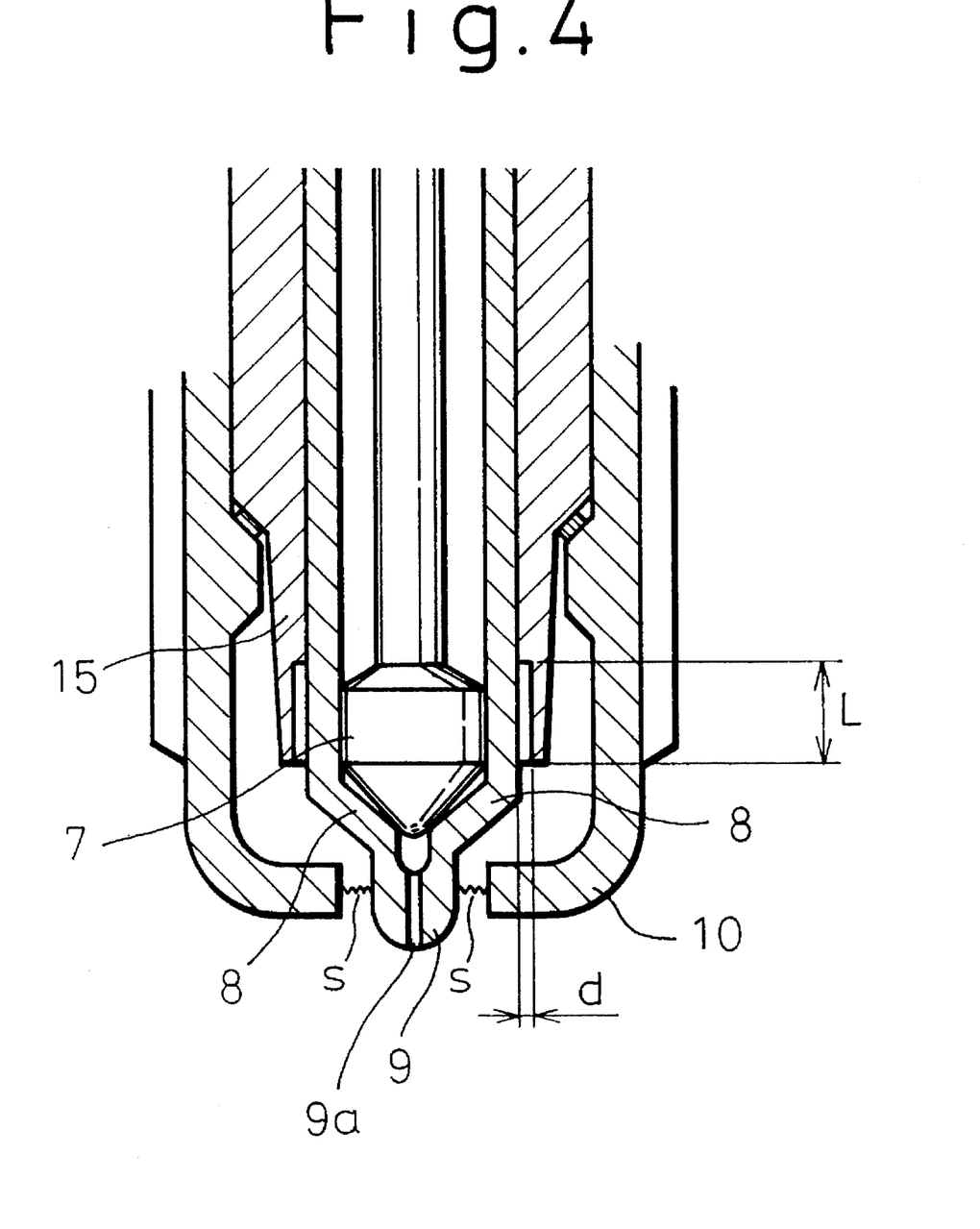
FIG. 4 is a enlarged detail of the bottom end portion of an fuel injector with an integrated spark plug of the present invention.

Accordingly, the center electrode 9, especially the middle part of it, attains the highest temperature and is most easily strained or deformed. However, the required level of the accuracy is lower than that of the portion of the seat where the needle 7 and the needle housing 8 contact with each other.

Conversely, the seat, does not attain a high temperature, strain does not occur and tar will not be deposited from the heated fuel.

As shown in FIG. 4, the inner side of the lower end portion of the fifth insulator is kept away from the outer surface of the needle housing 8 by distance "d", for the axial length "L" from the bottom end.

By keeping the inner side of the lower end portion of the fifth insulator 15 away from the outer surface of the needle housing 8 as described above, the needle housing 8 does not take heat away from the insulator 15 too much, and the fifth insulator 15 is not over cooled and no carbon is generated on it.

The heat value of the spark plug can be adjusted by varying the distance "d" and the length "L".

As described above, a fuel injector with an integrated spark plug according to the present invention can supply a desired amount of fuel at desired timing and can also induce a spark discharge with desired intensity, at desired timing and at a desired position.

We claim:

1. A fuel injector with an integrated spark plug for a direct injection type engine, comprising:

an electric conductor disposed along the central axis, said electric conductor being electrically coupled with a cable for supplying electric current for a spark discharge;

a needle valve made of conductive material, said needle valve being electrically coupled to said electric conductor through a return spring made of conductive material, said needle valve being reciprocally moved by a solenoid;

a needle housing made of conductive material, said needle housing receiving said needle valve, said needle housing having a nozzle for injecting fuel and a center electrode at its end;

a grounding electrode disposed to oppose said center electrode;

an insulator disposed outside of said electric conductors;

outer cylinder disposed outside of said insulators, said outer cylinder being composed of an inner wall which adheres to said insulator and an outer wall which is placed outside of said inner wall with a uniform clearance which is used as a fuel passage; and a connector assembly for connecting a fuel line and an electric cable for supplying an electric current to said solenoid.

2. A fuel injector with an integrated spark plug for a direct injection type engine according to claim 1, wherein said center electrode disposed at the end of said needle housing projects beyond the needle seat portion of said needle housing, and said grounding electrode being disposed radially outside the outside surface of said center electrode.

3. A fuel injector with an integrated spark plug for a direct injection type engine according to claim 1, wherein an insulator disposed around said needle housing being kept a predetermined distance away from the outer surface of said needle housing for a predetermined distance from the end of said insulator.

4. A fuel injector with an integrated spark plug for a direct injection type engine according to claim 1, wherein said insulator is axially separated into several pieces.

5. A fuel injector with an integrated spark plug for a direct injection type engine according to claim 4, wherein, at their junction, two of said separated insulators are connected to each other in a nested relationship, the axial end of the outer portion of one of said two of said separated insulators having different axial position compared to the position of the axial end of the inner portion, said axial end of the outer portion which is contiguous at an edge with the outer surface of said insulator which contacts with the inner wall of the outer cylinder being continuous in a stepped configuration with said axial end of the inner portion which is contiguous at an edge with the inner surface of said insulator which contacts the center located conductor at an edge.

6. A fuel injector with an integrated spark plug for a direct injection type engine according to claim 1, wherein said solenoid is surrounded with a ferrous magnetic material so as to make a closed magnetic circuit.

7. A fuel injector with an integrated spark plug for a direct injection type engine according to claim 6, wherein the parts which connects to the said ferrous magnetic material are made of non-magnetic materials so as to prevent the magnetism from leaking.

8. A fuel injector with an integrated spark plug for a direct injection type engine according to claim 1, wherein said needle housing is connected to the outer insulator by a threaded portion and adhesives are inserted into the clearance in the threaded portion.

9. A fuel injector with an integrated spark plug for a direct injection type engine according to claim 1, wherein said electric conductor is made of an outer pipe and and inner bar which are fixed to each other by caulking after being positioned to attain predetermined bias force of said spring.

10. A fuel injector with an integrated spark plug for a direct injection type engine according to claim 1, wherein said connector for connecting an outer fuel line and an outer electric cable can be attached to said outer cylinder regardless of the radial direction.

\* \* \* \* \*

UNITED STATES PATENT AND TRADEMARK OFFICE
CERTIFICATE OF CORRECTION

PATENT NO. : 5,497,744
DATED : 12 March 1996
INVENTOR(S) : Hideo NAGAOSA et al.

It is certified that error appears in the above-indentified patent and that said Letters Patent is hereby corrected as shown below:

| Column | Line | |
|---|---|---|
| 1 | 22 | Before "outer" change "a" to --an--. |
| 2 | 36 | Before "enlarged" change "a" to --an--. |
| 2 | 37 | Before "enlarged" change "a" to --an--. |
| 2 | 38 | Before "enlarged" change "a" to --an--. |
| 2 | 39 | Before "enlarged" change "a" to --an--. |
| 2 | 40 | Before "enlarged" change "a" to --an--; after "portion of" change "an" to --a--. |
| 2 | 44 | Before "fuel" change "an" to --a--. |
| 3 | 53 | Delete "are". |
| 3 | 54 | Delete "of". |

UNITED STATES PATENT AND TRADEMARK OFFICE
CERTIFICATE OF CORRECTION

PATENT NO. : 5,497,744

DATED : 12 March 1996

INVENTOR(S) : Hideo NAGAOSA et al.

It is certified that error appears in the above-indentified patent and that said Letters Patent is hereby corrected as shown below:

| Column | Line | |
|---|---|---|
| 4 | 18 | Change "inoculator 11" to --insulator 11--. |
| 4 | 50 | Before "enlarged" change "a" to --an--. |
| 4 | 54 | After "contacts" delete ";" before "electric" change "a" to --an--. |
| 4 | 63 | Before "enlarged" change "a" to --an--. |
| 4 | 67 | Change "a" to --an--. |
| 5 | 8 | After "However," delete "the". |
| 5 | 11 | Change "occur" to --occurs--. |
| 5 | 13 | Before "enlarged" change "a" to --an--. |
| 5 | 15 | Before "electric" change "a" to --an--. |
| 5 | 23 | Before "continuous" insert --a--. |

UNITED STATES PATENT AND TRADEMARK OFFICE
CERTIFICATE OF CORRECTION

PATENT NO. : 5,497,744
DATED : 12 March 1996
INVENTOR(S) : Hideo NAGAOSA et al.

It is certified that error appears in the above-indentified patent and that said Letters Patent is hereby corrected as shown below:

| Column | Line | |
|---|---|---|
| 5 | 24 | After "However," delete "the". |
| 5 | 25 | Before "right" insert --a--. |
| 5 | 27 | Change "occur" to --occurs--. |
| 5 | 31 | Change "enter" to --enters--. |
| 5 | 36 | After "reaches" delete "at". |
| 5 | 37 | After "located" insert --at--. |
| 5 | 38 | Change "connect" to --connects--; change "portion" to --portions--. |
| 5 | 39 | After "located" insert --at--. |
| 5 | 40 | After "located" insert --at--. |
| 8 | 18 | Change "and" (second occurrence) to --an--. |

Signed and Sealed this

Twentieth Day of August, 1996

Attest:

BRUCE LEHMAN

Attesting Officer       Commissioner of Patents and Trademarks